US012632407B2

(12) United States Patent
Jiang et al.

(10) Patent No.: US 12,632,407 B2
(45) Date of Patent: May 19, 2026

(54) WIRELESS CONTROL DEVICE FOR COMPUTER ACCESSORIES

(71) Applicant: Shenzhen Keling Future Technology Development Co., Ltd., Shenzhen (CN)

(72) Inventors: Xin Jiang, Shenzhen (CN); Qingli Ye, Shenzhen (CN); Zhaoming Feng, Shenzhen (CN)

(73) Assignee: Shenzhen Keling Future Technology Development Co., Ltd., Shenzhen (CN)

( * ) Notice: Subject to any disclaimer, the term of this patent is extended or adjusted under 35 U.S.C. 154(b) by 0 days.

(21) Appl. No.: 18/789,512

(22) Filed: Jul. 30, 2024

(65) Prior Publication Data

US 2026/0010508 A1      Jan. 8, 2026

(30) Foreign Application Priority Data

Jul. 2, 2024    (CN) .......................... 202421544203.2

(51) Int. Cl.
*G06F 13/42*        (2006.01)
*G06F 13/38*        (2006.01)
*G08C 17/02*        (2006.01)

(52) U.S. Cl.
CPC ........ *G06F 13/4282* (2013.01); *G06F 13/382* (2013.01); *G08C 17/02* (2013.01); *G06F 2213/28* (2013.01)

(58) Field of Classification Search
CPC .............. G06F 13/4282; G06F 13/382; G06F 2213/28; G08C 17/02
See application file for complete search history.

(56) References Cited

U.S. PATENT DOCUMENTS

| | | | |
|---|---|---|---|
| 2003/0224727 A1* | 12/2003 | Luzzatto ................. | G06F 3/038 |
| | | | 455/41.1 |
| 2007/0035462 A1* | 2/2007 | Hertel .................... | H01Q 9/285 |
| | | | 343/700 MS |
| 2008/0039007 A1* | 2/2008 | Wu ........................ | H04W 88/08 |
| | | | 455/3.01 |
| 2017/0110837 A1* | 4/2017 | Taniguchi .............. | H01R 12/53 |
| 2018/0302775 A1* | 10/2018 | Wang ..................... | H05B 47/19 |
| 2019/0264700 A1* | 8/2019 | Huggins ............... | F04D 27/002 |
| 2019/0346894 A1* | 11/2019 | Chang ................ | H05K 7/20209 |

* cited by examiner

*Primary Examiner* — Henry Tsai
*Assistant Examiner* — Harry Z Wang
(74) *Attorney, Agent, or Firm* — JEEN IP LAW, LLC

(57) ABSTRACT

The present invention belongs to the field of control technology, discloses a wireless control device for computer accessories, comprises: main control module, accessories control module and analog radiator signal module; The accessories control module comprises: a plurality of accessories interfaces and power supply interfaces, the accessories interface is used for connecting computer accessories, the power interface is used for connecting with the output of computer power supply, and the input end of analog radiator signal module is used for electrical connection with the fan interface of computer motherboard. The wireless communication connection between the main control module, the accessory control module and the analog radiator signal module can simplify the layout of the computer chassis; The accessory is powered from the power supply separately, which can monitor the temperature of each part of the chassis and improve the safety performance of the system.

9 Claims, 4 Drawing Sheets

WIRELESS CONTROL DEVICE FOR COMPUTER ACCESSORIES

TECHNICAL FIELD

The present invention belongs to the technical field of control, and particularly relates to a wireless control device for computer accessories.

BACKGROUND

Different types of computer accessories require dedicated interfaces. For example, the computer radiator requires a 4-pin PWM wire-controlled radiator interface, and the ARGB lamp requires a 3-pin interface. The computer has a plurality of radiators, and a plurality of ARGB lamps are also installed on the radiators or other accessories, so that more special interfaces are needed. However, due to the limited number of interfaces on the computer motherboard, the expansion capability of the above accessories is poor, and the temperature data of each part inside the computer cannot be collected; and secondly, when the number of accessories is large, more wires are used, and the complexity of computer chassis wiring is increased. Moreover, when more accessories are connected to the motherboard of the computer, the current of the motherboard will be increased, and the safety of the system will be reduced.

SUMMARY

The purpose of the present invention is to provide a wireless control device for computer accessories to solve the problems of poor expansion capability, complex wiring and low safety in the prior art.

In order to achieve the above purpose, the present invention adopts the following technical scheme: a wireless control device for computer accessories, which comprises a main control module, an accessory control module and a simulated radiator signal module; the main control module comprises a main control USB interface, which is electrically connected with the USB interface of a computer motherboard; The accessory control module comprises a plurality of accessory interfaces and a power supply interface, wherein the accessory interfaces are used for being connected with computer accessories, the power supply interface is used for being connected with the output end of a computer power supply, and the main control module is in wireless communication connection with the accessory control module; The analog radiator signal module is in wireless communication connection with the master control module, and the input end of the analog radiator signal module is used for being electrically connected with a fan interface of a computer mainboard.

Preferably, the computer accessory includes at least one heat sink, at least one RGB light string, and/or at least one temperature collector.

Preferably, the main control module comprises a control chip U1, a first clock circuit, a first wireless transceiving circuit, a signal interface circuit and a first voltage stabilizing circuit; the signal output end of the first clock circuit is electrically connected to the clock signal end of the control chip U1; A communication port of the first wireless transceiving circuit is electrically connected with a communication port of the control chip U1, and the first wireless transceiving circuit is used as a wireless signal transceiving terminal of the master control module; The signal input end of the signal interface circuit and the power input end of the first voltage stabilizing circuit are used as a common end to be electrically connected with a communication port of a mainboard of a computer, The power output end of the first voltage stabilizing circuit is electrically connected with the power input end of the control chip U1 and the power input end of the signal interface circuit respectively.

Preferably, the signal interface circuit comprises a communication driver chip U2 and a communication interface J1, wherein the communication interface J1 is used as the signal input end of the signal interface circuit and the power input end of the first voltage stabilizing circuit is used as a common end; the communication driver chip U2 is a USB driver chip, and the communication interface J1 is a master control USB interface.

Preferably, a resistor R1 is connected in series between the power output end of the first voltage stabilizing circuit and the power input end of the control chip U1, and the power input end of the signal interface circuit is directly electrically connected to the power output end of a first voltage stabilizing circuit.

Preferably, the power interface is a four-core interface J4, and the accessory interface comprises a temperature collection interface J6, a light string interface J3 and a radiator interface J2.

Preferably, the accessory control module further comprises a control chip U4, a second clock circuit, a second wireless transceiving circuit and a second voltage stabilizing circuit; the power input end of the second voltage stabilizing circuit is electrically connected to the power interface, and the power output end of the second voltage regulating circuit is electrically connected to the power input end of the control chip U4; The signal output end of the second clock circuit is electrically connected with the clock signal end of the control chip U4, the communication port of the second wireless transceiver circuit is electrically connected with the communication port of the control chip U4, and the second wireless transceiver circuit is used as a wireless signal transceiver end of an accessory control module; The lamp string interface J3 is electrically connected with a lamp string control port of the control chip U4, and the radiator interface J2 is electrically connected with a radiator control port of the control chip U4.

Preferably, a resistor R6 is connected in series between the power output end of the second voltage stabilizing circuit and the power input end of the control chip U4.

Preferably, the analog heat sink signal module comprises a computer mainboard fan interface J5, a third voltage stabilizing circuit, a control chip U6, a third clock circuit and a third wireless transceiving circuit;

The power output end of the computer mainboard fan interface J5 is electrically connected with the power input end of the third voltage stabilizing circuit, and the power output end of the third voltage stabilizing circuit is electrically connected with the power input end of a control chip U6; The PWM signal output end of the computer mainboard fan interface J5 is electrically connected with the PWM signal input end of the control chip U6, and the feedback signal output end of the control chip U6 is electrically connected with the feedback signal receiving end;

The feedback signal output end is used for outputting a feedback signal of the actual rotating speed of the radiator;

The signal output end of the third clock circuit is electrically connected with the clock signal end of the control chip U6;

The communication port of the third wireless transceiver circuit is electrically connected with the communication port of the control chip U6, and the third wireless transceiver circuit is used as a wireless signal transceiver terminal of the analog radiator signal module.

Preferably, a resistor R16 is connected in series between the power output end of the third voltage stabilizing circuit and the power input end of the control chip U6; a resistor R12 is connected in series between the PWM signal output end of the computer motherboard fan interface J5 and the PWM signal input end of control chip U6; A resistor R11 is connected in series between the feedback signal output end of the control chip U6 and the feedback signal receiving end of the computer mainboard fan interface J5.

The present invention uses the main control module, the accessory control module and the simulated radiator signal module to separately control the radiator and the RGB lamp string and collect the temperature of the accessory, and the main control module, the accessory control module and the simulated radiator signal module are connected by wireless communication, which reduces the number of wires inside the computer case and simplifies the layout of the computer case;

Because the temperature collector, the radiator and the RGB lamp string are not directly connected with the computer mainboard and are not electrified from the computer mainboard and are separately electrified from the power supply, the temperature of each part inside the case can be monitored, the current passing through the mainboard is reduced, the heating of the mainboard is reduced, and the safety performance of the system is improved.

BRIEF DESCRIPTION OF DRAWINGS

The drawings are intended to provide a further understanding of the embodiments of the present invention, constitute a part of the specification, and are used together with the following detailed description to explain the embodiments of the present invention, but do not constitute a limitation to the embodiments of this present invention. In that drawing.

DESCRIPTION OF EMBODIMENTS

In order to more clearly illustrate the embodiments of the present invention or the technical solutions in the prior art, the present invention will be briefly introduced below in combination with the drawings and the description of the embodiments or the prior art. Obviously, the following description on the structure of the drawings is only some embodiments of the present invention. For those of ordinary skill in the art, Other drawings can be obtained from these drawings without creative effort. It should be noted that the description of these embodiments is used to help understand the present invention, but does not constitute a limitation to the present invention.

Figure 1:
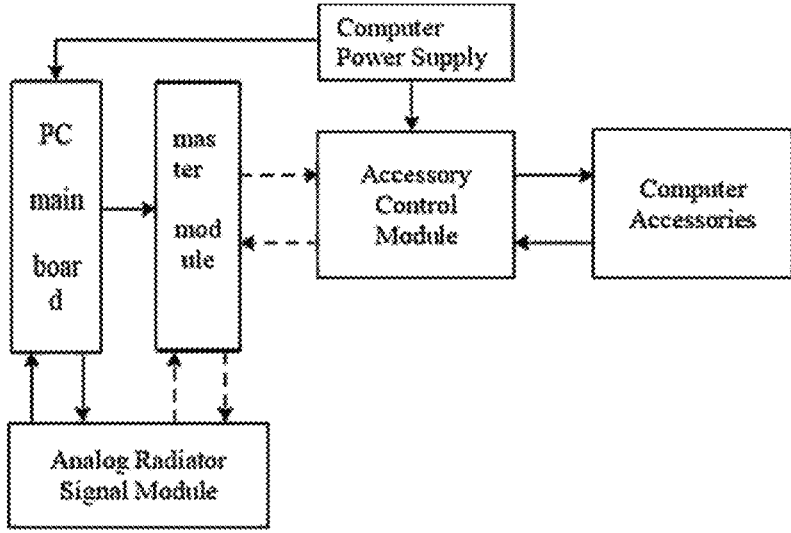
FIG. 1 is an overall block diagram of a wireless control device for computer accessories provided by an embodiment of the present invention.

FIG. 1 is an overall block diagram of a wireless control device for computer accessories provided by an embodiment of the present invention. As shown in FIG. 1, the embodiment provides a wireless control device for computer accessories, which comprises a control module, an accessory control module and a simulated radiator signal module.

The main control module comprises a main control USB interface, which is electrically connected with the USB interface of the computer mainboard; the accessory control module comprises a plurality of accessory interfaces and a power supply interface, wherein the accessory interfaces are used for connecting computer accessories, and the power supply interface is used for connecting with the output end of a computer power supply.

In this embodiment, the accessory control module collects temperature data, which is fed back to the main control module through the USB interface, and the computer mainboard can adjust the PWM signal of the fan interface of the computer mainboard according to the temperature. The master control module generates a control signal after receiving the PWM signal and sends the control signal to the accessory control module, and the accessory control module generates a corresponding PWM signal according to the control signal to drive a radiator, The accessory control module simultaneously collects the actual rotating speed of the radiator and feeds back the actual rotating speed to the simulated radiator signal module through the main control module, and the simulated radiator signal module generates a rotating speed signal and sends the rotating speed signal to the computer mainboard.

In this embodiment, the computer accessory comprises at least one radiator, at least one RGB light string and/or at least one temperature collector, the computer accessory can only comprise one radiator, or can comprise a plurality of radiators, a plurality of RGB light strings and a plurality of temperature collectors at the same time, and because the radiator, the RGB light strings and the temperature collectors are not directly connected with a computer mainboard, The temperature of each part inside the chassis can be monitored, the current passing through the mainboard is reduced, the heating of the mainboard is reduced, and the safety performance of the system is improved; And that main control module is connected with the accessory control module in a wireless communication way and used for sen the generated control signal to the accessory control module, and the accessories connected with the compute accessories are controlled to execute corresponding functions after receiving the control signal.

The master control module is in wireless communication connection with the analog radiator signal module, and the input end of the analog radiator signal module is used for electrical connection with the fan interface of the computer mainboard.

In this embodiment, the accessory control module collects temperature data, which is fed back to the main control module through the USB interface, and the computer mainboard can adjust the PWM signal of the fan interface of the computer mainboard according to the temperature. The analog radiator signal module is use for transmitting a PWM signal collect from that fan interface of the computer mainboard to the master control module, and the master control module generate a control signal of the radiator after receiving the PWM signal data and transmits the control signal of the radiator to the accessory control module, The accessory control module generates a corresponding PWM signal to drive the radiator according to a control signal of the radiator, the accessory control module simultaneously collects the actual rotating speed of the radiator and feeds back the actual rotating speed to the simulated radiator signal module through the main control module, and the simulated radiator signal module generates a rotating speed signal and sends the rotating speed signal to a computer mainboard, The analog radiator signal module feeds back the actual rotating speed of the radiator to the computer mainboard, so that the computer mainboard can perform closed-loop control on the radiator;

In this embodiment, the control signal of the main control module includes the control signal of the heat sink, the control signals of the RGB light strings, and the temperature acquisition signal. The control signals of the RGB light strings may be generated according to the configuration of a user, for example, the main control module is communicatively connected to a mainboard of a computer, and may be configured and modified. After the main control module generates a control signal, the control signal is sent to the accessory control module in a wireless communication mode, the accessory control module enables the RGB lamp strings to execute corresponding functions according to the received control signal, The wireless communication of this embodiment may be 2.4G, 433 MHz, Bluetooth, WiFi, etc. Therefore, the main control module is connected with the accessory control module and the analog radiator signal module through wireless communication, so that the number of wirings inside the computer case is reduced, and the layout of the computer case can be simplified.

Figure 2:
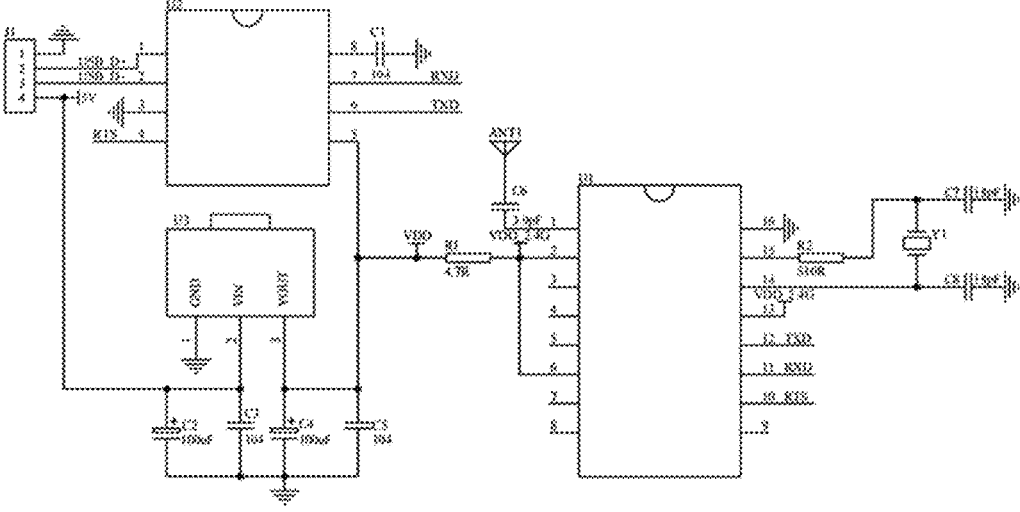
FIG. 2 is a schematic diagram of a main control module provided by an embodiment of the present invention.

As a further optimization of this embodiment, as shown in FIG. 2, the main control module comprises a control chip U1, a first clock circuit, a first wireless transceiving circuit, a signal interface circuit and a first voltage stabilizing circuit; the signal output end of the first clock circuit is electrically connected to the clock signal end of the control chip U1; A communication port of the first wireless transceiving circuit is electrically connected with a communication port of the control chip U1, and the first wireless transceiving circuit is used as a wireless signal transceiving terminal of the master control module; The signal input end of the signal interface circuit and the power input end of the first voltage stabilizing circuit are used as a common end to be electrically connected with a communication port of a mainboard of a computer, The power output end of the first voltage stabilizing circuit is electrically connected with the power input end of the control chip U1 and the power input end of the signal interface circuit respectively.

In this embodiment, the first clock circuit comprises a crystal oscillator Y1, a capacitor C7, a capacitor C8 and a resistor R2; the first wireless transceiving circuit comprises an antenna ANT1 and a capacitor C6; the first voltage stabilizing circuit comprises a voltage stabilizing chip U3, a capacitor C2, a capacitance C3, a capacitance C4 and a capacitance C5; The signal interface circuit comprises a communication driving chip U2, a communication interface J1 and a capacitor C1.

In this embodiment, the control chip U1 is a 16-pin chip, the communication driving chip U2 is an 8-pin chip, the voltage stabilizing chip U3 is a 3-pin chip, and the communication interface J1 serves as the signal input end of the signal interface circuit and the power input end of the first voltage stabilizing circuit serve as a common end. In this embodiment, a resistor R1 is connected in series between the power output end of the first voltage stabilizing circuit and the power input end of the control chip U1, and the power input end of the signal interface circuit is directly electrically connected to the power output end of a first voltage stabilizing circuit.

In this embodiment, the first pin of the control chip U1 is used as the communication port of the control chip U1, the first pin of the capacitor C6 is used as the communication port of the first wireless transceiving circuit, and the fifteenth pin and the fourteenth pin are used as clock signal terminals of the control chips U1. The eleventh pin and the twelfth pin of the control chip U1 are used as communication ports of the control chip U1 and the communication driving chip U2.

In this embodiment, the first pin and the second pin of the communication driving chip U2 are used as a signal interface circuit electrically connected to the communication port of the USB interface of the computer, and the sixth pin and the seventh pin of the communication driving chip U2 are used as a communication port of the signal interface circuit and the control chip U1.

In this embodiment, the second pin of the voltage stabilizing chip U3 is used as the power input terminal of the first voltage stabilizing circuit, and the third pin of the voltage stabilizing chip U3 is used as the power output terminal of the first voltage stabilizing circuit.

Specifically, the circuit connection relationship of the master control module is as follows: the first pin of the control chip U1 is electrically connected to the first pin of the capacitor C6, the second pin of the capacitor C6 is electrically connected to the signal end of the antenna ANT1, and the antenna ANT1 is used as the signal transceiving end of the master control module; the sixteenth pins of the control chip U1 are grounded; A fifteenth pin of the control chip U1 is electrically connected to a first pin of the resistor R2, a second pin of the resistor R2 is respectively electrically connected to a first pin of a crystal oscillator Y1 and a first pins of a capacitor C7, and a fourteenth pin of the control chip U1 is respectively electrically connected to the second pin of crystal oscillator Y1 and the first pins of capacitor C8. A second pin of the capacitor C7 and a second pin of the capacitor C8 are grounded, a twelfth pin of the control chip U1 is electrically connected to a sixth pin of a communication driving chip U2, an eleventh pin of the control chip U1 is electrically connected to a seventh pin of communication driving chip U2, and a tenth pin of control chip U1 and a fourth pin thereof are electrically connected; A second pin, a sixth pin and a thirteenth pin of the control chip U1 are all electrically connected with a first pin of the resistor R1, and a second pin of the resistor R1 is respectively electrically connected with a fifth pin of a communication driving chip U2, a third pin of a voltage stabilizing chip U3, a first pin of an electric capacitor C5 and an anode of an electric capacitor C4; A first pin of the communication driving chip U2 is electrically connected with a second pin of the communication interface J1, and a second pin of said communication driving chip U2 is electrically connected with a third pin of said communication interface J1; A third pin of the communication driving chip U2, a first pin of the communication interface J1, a first pin of the voltage stabilizing chip U3, a second pin of a capacitor C1, a cathode of a capacitor C2, a second pin of a capacitor C3, a cathode of a capacitance C4, and a second Pin of a capacitance C5 are all grounded, and an eighth pin of the communications driving chip U2 is electrically connected to the first pin.

In this embodiment, the communication interface J1 is plugged into a USB interface of a computer motherboard, the main control module can be accessed through the computer motherboard, operations such as adjustment, modification and addition can be performed on the control instructions of the control chip U1 of the main control module on the computer, and then the control chip U1 generates a corresponding control signal according to the operation result. The control signal is then sent by the antenna ANT1 to the accessory control module.

In this embodiment, the voltage regulating chip U3 is used to regulate the input voltage, the input voltage of the voltage regulating chip U3 is 5V, the output voltage of the voltage regulating chips U3 is 3.3V, and the operating voltage range of the control chip U1 is 2.4V~3.6V.

As a further optimization of this embodiment, the communication driver chip U2 is a USB driver chip, the communication interface J1 is a master control USB interface, and the computer motherboard is provided with a large number of USB interfaces to facilitate the connection between the master control module and the computer motherboard.

Figure 3:
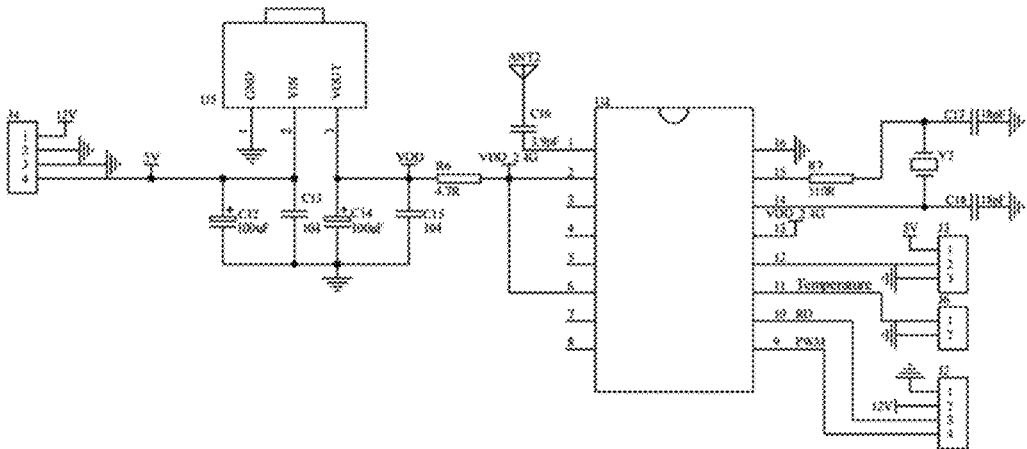
FIG. 3 is a schematic diagram of an accessory control module provided by an embodiment of the present invention.

As a further optimization of this embodiment, as shown in FIG. 3, the power interface is a four-core interface J4, and the accessory interface comprises a temperature collection interface J6, a light string interface J3 and a radiator interface J2, wherein the temperature collection interface J6 is used to connect a temperature collector, and the light string interface J3 is used to connect RGB light strings. The heatsink connector J2 is used to connect the heatsink.

In this embodiment, the accessory control module further comprises a control chip U4, a second clock circuit, a second wireless transceiving circuit and a second voltage stabilizing circuit, wherein the power input end of the second voltage stabilizing circuit is electrically connected to the power interface, and the power output end of the second voltage regulating circuit is electrically connected to the power input end of the control chip U4; The signal output end of the second clock circuit is electrically connected with the clock signal end of the control chip U4, the communication port of the second wireless transceiver circuit is electrically connected with the communication port of the control chip U4, and the second wireless transceiver circuit is used as a wireless signal transceiver end of an accessory control module; The lamp string interface J3 is electrically connected with a lamp string control port of the control chip U4, and the radiator interface J2 is electrically connected with a radiator control port of the control chip U4.

In this embodiment, the control chip U4 is a 16-pin chip, wherein the first pin of the control chip U4 is used as a communication port of the control chips U4, and the fifteenth pin and the fourteenth pin of the control chips U4 are used as clock signal terminals of the same. The second pin, the sixth pin, and the thirteenth pin of the control chip U4 are used as the power input port of the control chip U4, the twelfth pin of the controller chip U4 is used as the light string control port of the controller chip U4, and the eleventh pin thereof is used as a temperature acquisition port thereof. A ninth pin and a tenth pin of the control chip U4 are used as control ports of a heat sink of the control chip U4, wherein the ninth pin of the control chips U4 is used for outputting a PWM signal, and the tenth pin of each control chip is used for collecting an actual rotating speed of the heat sink.

In this embodiment, the second wireless transceiving circuit includes an antenna ANT2 and a capacitor C16, a first pin of the capacitor C16 is used as a communication port of the second wireless transceiving circuit, and the antenna ANT2 is used as a signal transceiving terminal of the accessory control module.

In this embodiment, the second clock circuit includes a crystal oscillator Y2, a capacitor C17, a capacitor C18, and a resistor R7.

In this embodiment, the second voltage stabilizing circuit comprises: a voltage stabilizing chip U5, a capacitor C12, a capacitor C13, a capacitor C14 and a capacitor C15; the voltage stabilizing chip U5 is a three-pin chip, the second pin of the voltage stabilizing circuit U5 is used as the power input end of the second voltage stabilizing circuit, and the third pin of the voltage regulating chip U5 is used as the power output end of the second voltage regulating circuit.

In this embodiment, a resistor R6 is connected in series between the power output end of the second voltage stabilizing circuit and the power input end of the control chip U4.

Specifically, the circuit connection relationship of the accessory control module is as follows: a first pin of the control chip U4 is electrically connected to a first pin of the capacitor C16, and a second pin of the capacitor C16 is electrically connected to the signal end of the antenna ANT2; a sixteenth pin of said control chip U4 is grounded; A fifteenth pin of the control chip U4 is electrically connected to a first pin of the resistor R7, a second pin of the resistor R7 is respectively electrically connected to a first pin of a crystal oscillator Y2 and a first Pin of a capacitor C17, and a fourteenth pin of the control chip U4 is respectively electrically connected to the second pin of crystal oscillator Y2 and the first Pin of capacitor C18. The second pin of the capacitor C17 and the second pin of the capacitor C18 are both grounded; A twelfth pin of the control chip U4 is electrically connected to a second pin of the light string interface J3, an eleventh pin of the control chip U4 is electrically connected to a first pin of a temperature collection interface J6, and a tenth pin of the controller chip U4 and a third pin of a heat sink interface J2. A ninth pin of the control chip U4 is electrically connected with a fourth pin of the heat sink interface J2, and a second pin of the temperature collection interface J6, a third pin of a lamp string interface J3, and a first pin of a heat sink interface J2 are all grounded; A second pin, a sixth pin and a thirteenth pin of the control chip U4 are all electrically connected with a first pin of the resistor R6, and a second pin of the resistor R6 is electrically connected with a third pin, a first pin and an anode of the capacitor C15 of the voltage-stabilizing chip U5, respectively; The fourth pin of the four-core interface J4 is electrically connected with the positive electrode of the capacitor C12, the first pin of the capacitor C13, the second pin of a voltage-stabilizing chip U5, and the first pin of a lamp string interface J3, respectively; The second pin and the third pin of the four-core interface J4, the first pin of the voltage-stabilizing chip U5, the cathode of the capacitor C12, the second pin of the capacitor C13, the cathode of the capacitor C14, and the second pin of a capacitor C15 are all grounded.

In this embodiment, the antenna ANT2 is used to receive the control signal sent by the antenna ANT1 of the main control module, and the control chip U4 controls the heat sink and the RGB light strings to perform corresponding functions according to the control signal.

In this embodiment, the four-core interface J4 is directly connected to the adaptive output interface of the computer power supply, the output voltages of the computer power supply are 5V and 12V, the voltage stabilizing chip U5 is used to regulate the input voltage, the input voltage of the voltage stabilizing chip U5 is 5V, and the output voltage of the voltage stabilizing chips U5 is 3.3V. The operating voltage range of the control chip U4 is 2.4 V~3.6 V.

As a further optimization of this embodiment, the analog heat sink signal module comprises a computer mainboard fan interface J5, a third voltage stabilizing circuit, a control chip U6, a third clock circuit and a third wireless transceiving circuit; The analog radiator signal module comprise a computer mainboard fan interface J5, a third voltage stabilize circuit, a control chip U6, a third clock circuit and a third wireless transceiving circuit; The power output end of the computer mainboard fan interface J5 is electrically connected with the power input end of the third voltage stabilizing circuit, and the power output end of the third voltage stabilizing circuit is electrically connected with the power input end of a control chip U6; A PWM signal output end of the computer mainboard fan interface J5 is electrically connected with a PWM signal input end of the control chip U6, and a feedback signal output end of the control chip U6 is electrically connected with a feedback signal receiving end of the computer mainboard fan interface J5; The signal output end of the third clock circuit is electrically connected with the clock signal end of the control chip U6, the communication port of the third wireless transceiver circuit is electrically connected with the communication port of the control chip U6, and the third wireless transceiver circuit is used as a wireless signal transceiver end of an analog radiator signal module.

In this embodiment, a resistor R16 is connected in series between the power output end of the third voltage stabilizing circuit and the power input end of the control chip U6; a resistor R12 is connected in series between the PWM signal output end of the computer mainboard fan interface J5 and the PWM signal input end of control chip U6; A resistor R11 is connected in series between the feedback signal output end of the control chip U6 and the feedback signal receiving end of the computer mainboard fan interface J5.

In this embodiment, the control chip U6 is a 16-pin chip, wherein the first pin of the control chip U6 is used as a communication port of the control chips U6, and the fifteenth pin and the fourteenth pin of the control chips U6 are used as clock signal terminals of the same. The second pin, the sixth pin, and the thirteenth pin of the control chip U6 are used as the power input port of the control chip U6, the seventh pin of the controller chip U6 is used as the feedback signal output port of the controller chip U6, and the eighth pin is used as a PWM signal input port.

In this embodiment, the third wireless transceiving circuit includes an antenna ANT3 and a capacitor C26, a first pin of the capacitor C26 is used as a communication port of the third wireless transceiving circuit, and the antenna ANT3 is used as a signal transceiving end of the analog radiator signal module.

In this embodiment, the third clock circuit includes a crystal oscillator Y3, a capacitor C27, a capacitor C28, and a resistor R17.

In this embodiment, the third voltage stabilizing circuit comprises: a voltage stabilizing chip U7, a capacitor C22, a capacitor C23, a capacitance C24, and a capacitance C25; the voltage stabilizing chip U7 is a three-pin chip, the second pin of the voltage stabilizing circuit U7 is used as the power input end of the third voltage stabilizing circuit, and the third pin of the voltage regulating chip U7 is used as the power output end of the third voltage regulating circuit.

In this embodiment, the eleventh pin of the control chip U4 of the accessory control module collects the temperature data of the radiator, which is fed back to the main control module by the accessory control module and fed back to the computer mainboard through the USB interface. The computer mainboard can adjust the PWM signal of the fan interface of the computer mainboard according to the temperature. The analog radiator signal module detects a PWM signal of a computer mainboard fan interface through a fourth pin of the computer mainboard fan interface J5 and sends the PWM signal to the master control module, and the master control module generates a control signal of the radiator after receiving the PWM signal and sends the control signal of the radiator to the accessory control module, The accessory control module generates a corresponding PWM signal to drive the heat sink; Meanwhile, a tenth pin of a control chip U4 of the accessory control module acquires the actual rotating speed data of the radiator, the accessory control module feeds back the actual rotating speed data to the analog radiator signal module through the master control module, and the actual rotating speeds generated by the analog radiator signal module are transmitted to a computer mainboard through a third pin of a computer mainboard fan interface J5. O that the motherboard can carry out closed loop control on the heat sink.

Figure 4:
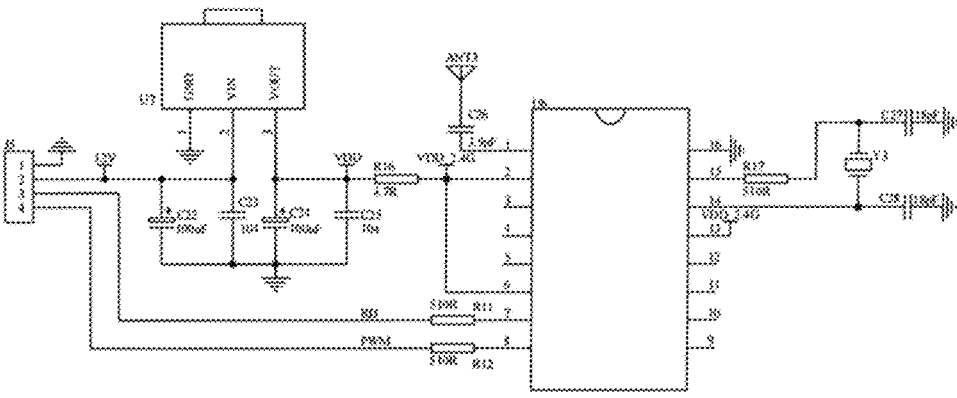
FIG. 4 is a schematic diagram of an analog radiator signal module provided by an embodiment of the present invention.

Specifically, as shown in FIG. 4, the circuit connection relationship of the analog heat sink signal module is as follows: a first pin of the control chip U6 is electrically connected to a first pin of the capacitor C26, a second pin of the capacitor C26 is electrically connected to a signal end of an antenna ANT3, and the antenna ANT3 serves as a signal receiving end of the analog heat sink signal module; The sixteenth pin of the control chip U6 is grounded; A fifteenth pin of the control chip U6 is electrically connected to a first pin of the resistor R17, a second pin of the resistor R17 is respectively electrically connected to a first pin of a crystal oscillator Y3 and a first Pin of a capacitor C27, and a fourteenth pin of the control chip U6 is respectively electrically connected to the second pin of crystal oscillator Y3 and a first Pin of a capacitor C28. A second pin of the capacitor C27 and a second pin of the capacitor C28 are grounded, a second pin, a sixth pin and a thirteenth pin of the control chip U6 are all electrically connected to a first pin of a resistor R16, and the second pin is respectively electrically connected to a third pin of a voltage-stabilizing chip U7, a first pin of an electric capacitor C25 and an anode of an electric capacitor C24; A second pin of the computer mainboard fan interface J5 is electrically connected with a positive electrode of the capacitor C22, a first pin of the capacitor C23, and a second pin of a voltage stabilizing chip U7, respectively, a third pin of the computer mainboard fan interface J5 is electrically connected with a first pin of a resistor R11, and a second pins of the resistor R11 are electrically connected with seventh pins of a control chip U6; A fourth pin of the computer mainboard fan interface J5 is electrically connected to a first pin of the resistor R12, and a second pin of the resistor R12 is electrically connected to an eighth pin of a control chip U6; The first pin of the computer mainboard fan interface J5, the first pin of the voltage stabilizing chip U7, the negative electrode of the capacitor C22, the second pin of the capacitor C23, the negative electrode of a capacitor C24, and the second pin of a capacitor C25 are all grounded.

In this embodiment, the computer motherboard fan interface J5 is directly connected to the fan interface of the computer motherboard, and the third pin and the fourth pin of the computer motherboard fan interface J5 are used as the RD rotation speed feedback output pin and the PWM signal detection pin; After the antenna ANT3 receives the detection task start command from the main control module, the control chip U6 controls its seventh pin to detect the PWM rotation speed data, and the eighth pin feeds back the radiator rotation speed collected from the accessory control module, so as to realize the detection feedback of the working state of the computer radiator, including PWM rotation speed control, RD rotation speed feedback and other data.

Finally, it should be noted that the above is only a preferred embodiment of the present invention, and is not used to limit the scope of protection of the present invention. Any modification, equivalent substitution, improvement, etc. within the spirit and principle of the present invention shall be included in the scope of protection of the present invention.

The invention claimed is:

1. A wireless control device for computer accessories is characterized in that the device comprises a master control module, an accessory control module and an analog radiator signal module, wherein the master control module comprises a master control USB interface which is electrically connected with a USB interface of a computer mainboard; the accessory control module comprises a plurality of accessory interfaces and a power supply interface, wherein the accessory interfaces are used for being connected with computer accessories, the power supply interface is used for being connected with the output end of a computer power supply, and the main control module is in wireless communication connection with the accessory control module; the analog radiator signal module is in wireless communication connection with the master control module, and the input end of the analog radiator signal module is used for being electrically connected with a fan interface of the computer mainboard;

wherein the main control module comprises a control chip U1, a first clock circuit, a first wireless transceiver circuit, a signal interface circuit and a first voltage stabilizing circuit; the signal output end of the first clock circuit is electrically connected with the clock signal end of the control chip U1; a communication port of the first wireless transceiving circuit is electrically connected with a communication port of the control chip U1, and the first wireless transceiving circuit is used as a wireless signal transceiving terminal of the master control module; the signal input end of the signal interface circuit and the power input end of the first voltage stabilizing circuit are used as a common end to be electrically connected with a communication port of a computer mainboard, the signal output end of the signal interface circuit is electrically connected with a signal input port of a control chip U1, the power output end of the first voltage stabilizing circuit is electrically connected with the power input end of the control chip U1 and the power input end of the signal interface circuit respectively.

2. The wireless control device for computer accessories according to claim 1, wherein the computer accessories comprise at least one heat sink, at least one RGB light string and/or at least one temperature collector.

3. The wireless control device for computer accessories according to claim 1, wherein the signal interface circuit comprises a communication driving chip U2 and a communication interface J1, wherein the communication interface J1 is used as a signal input end of the signal interface circuit, and the power input end of the first voltage stabilizing circuit is used as a common end; The communication driving chip U2 is a USB driving chip, and the communication interface J1 is a master control USB interface.

4. The wireless control device for computer accessories according to claim 1, wherein a resistor R1 is connected in series between the power output terminal of the first voltage stabilizing circuit and the power input terminal of the control chip U1, and the power input terminal of the signal interface circuit is directly electrically connected to the power output terminal of first voltage stabilizing circuit.

5. The wireless control device for computer accessories according to claim 1, wherein the power interface is a four-core interface J4, and the accessory interfaces comprise a temperature acquisition interface J6, a lamp string interface J3 and a radiator interface J2.

6. The wireless control device for computer accessories according to claim 5, wherein the accessory control module further comprises a control chip U4, a second clock circuit, a second wireless transceiver circuit and a second voltage regulator circuit;

the power input end of the second voltage stabilizing circuit is electrically connected with the power interface, and the power output end of the second voltage stabilizing circuit is electrically connected with the power input end of a control chip U4;

a communication port of the second wireless transceiving circuit is electrically connected with a communication port of the control chip U4, and the second wireless transceiving circuit is used as a wireless signal transceiving end of the accessory control module;

the lamp string interface J3 is electrically connected with a lamp string control port of the control chip U4, and the radiator interface J2 is electrically connected with a radiator control port of the control chip U4.

7. The wireless control device for computer accessories according to claim 6, wherein a resistor R6 is connected in series between the power output end of the second voltage stabilizing circuit and the power input end of the control chip U4.

8. The wireless control device for computer accessories according to claim 1, wherein the analog heat sink signal module comprises a computer mainboard fan interface J5, a third voltage regulator circuit, a control chip U6, a third clock circuit and a third wireless transceiver circuit;

the power output end of the computer mainboard fan interface J5 is electrically connected with the power input end of the third voltage stabilizing circuit, and the power output end of the third voltage stabilizing circuit is electrically connected with the power input end of a control chip U6;

a PWM signal output end of the computer mainboard fan interface J5 is electrically connected with a PWM signal input end of the control chip U6, and a feedback signal output end of the control chip U6 is electrically connected with a feedback signal receiving end of the computer mainboard fan interface J5;

the signal output end of the third clock circuit is electrically connected with the clock signal end of the control chip U6, the communication port of the third wireless transceiver circuit is electrically connected with the communication port of the control chip U6, and the third wireless transceiver circuit is used as a wireless signal transceiver end of an analog radiator signal module.

9. The wireless control device for computer accessories according to claim 8, wherein a resistor R16 is connected in series between the power output end of the third voltage regulator circuit and the power input end of the control chip U6; a resistor R12 is connected in series between the PWM signal output end of the computer mainboard fan interface J5 and the PWM signal input end of control chip U6; a resistor R11 is connected in series between the feedback signal output end of the control chip U6 and the feedback signal receiving end of the computer mainboard fan interface J5.

* * * * *